(12) United States Patent
Barois

(10) Patent No.: US 12,160,281 B2
(45) Date of Patent: *Dec. 3, 2024

(54) METHOD FOR COLLECTING INFORMATION FROM A SET OF ELECTRICITY METERS

(71) Applicant: SAGEMCOM ENERGY & TELECOM SAS, Rueil Malmaison (FR)

(72) Inventor: Jérôme Barois, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 218 days.

This patent is subject to a terminal disclaimer.

(21) Appl. No.: 17/523,548

(22) Filed: Nov. 10, 2021

(65) Prior Publication Data

US 2022/0173767 A1 Jun. 2, 2022

(30) Foreign Application Priority Data

Nov. 30, 2020 (FR) ...................... 2012432

(51) Int. Cl.
*H04B 3/54* (2006.01)
*G08C 19/00* (2006.01)

(52) U.S. Cl.
CPC ............. *H04B 3/546* (2013.01); *G08C 19/00* (2013.01)

(58) Field of Classification Search
None
See application file for complete search history.

(56) References Cited

U.S. PATENT DOCUMENTS

| | | | |
|---|---|---|---|
| 10,989,746 B2 * | 4/2021 | Teboulle | H04Q 9/02 |
| 2012/0281716 A1 * | 11/2012 | Vijayasankar | H04B 3/542 |
| | | | 370/480 |
| 2013/0027219 A1 | 1/2013 | Myoung et al. | |
| 2020/0209292 A1 * | 7/2020 | Teboulle | H04Q 9/00 |

FOREIGN PATENT DOCUMENTS

| | | | | |
|---|---|---|---|---|
| EP | 2894872 A1 * | 7/2015 | | H04B 3/546 |
| WO | 2017/152951 A1 | 9/2017 | | |
| WO | WO-2019016053 A1 * | 1/2019 | | G01R 22/063 |

OTHER PUBLICATIONS

EP-2894872-A1 English Language Translation (Year: 2015).*
WO-2019016053-A1 English Language Translation (Year: 2019).*
Jul. 22, 2021 Search Report issued in French Patent Application No. 2012432.

* cited by examiner

*Primary Examiner* — Adnan Aziz
*Assistant Examiner* — Jerold B Murphy
(74) *Attorney, Agent, or Firm* — Williams Mullen; R. Brian Drozd

(57) ABSTRACT

A data concentrator makes a collection from electricity meters in a powerline communication network. The electricity meters are distributed in a plurality of classes, and are ordered, in each class, according to an overall risk of collision incurred in the powerline communication network. When the data concentrator seeks to address another electricity meter to be addressed in parallel to an electricity meter currently being addressed, the data concentrator seeks to maximise the number of the electricity meters addressed in parallel, prioritising the electricity meters in a sequencing of the classes and a sequencing according to an overall risk of collision. This other electricity meter must present a risk of collision with each of the electricity meters currently being addressed below a predefined threshold.

12 Claims, 3 Drawing Sheets

METHOD FOR COLLECTING INFORMATION FROM A SET OF ELECTRICITY METERS

TECHNICAL FIELD

The present invention relates to a method for collecting information held by a set of electricity meters connected by an electrical supply network to a data concentrator with which said electricity meters communicate by means of powerline communications (PLC).

PRIOR ART

Powerline communications are developing, in particular in the context of an automatic management of meters AMM (standing for "automated meter management") in electrical supply networks. Communication networks are thus implemented on top of electrical supply networks to make an automated collection, from smart electricity meters, of energy consumption reading data. Powerline communications use, for example, communication protocols of the PLC type, such as the G3-PLC protocol (standing for "Third Generation PLC", in accordance with the ITU-T standard G.9903) or PRIME protocol (standing for "PoweRline Intelligent Metering Evolution").

One principle of powerline communications consists in superimposing, on an alternating electrical supply signal, referred to as a carrier signal or carrier, an information signal with a higher frequency and low energy representing data to be transmitted.

With the development of automated meter management AMM on electrical supply networks new problems are posed. In particular, such communication networks comprise a large number of electricity meters for which a reading of information (for example load curves) must be made in a short time. However, such communication networks use a method for access to the medium of the CSMA/CA type (standing for "Carrier Sense Multiple Access with Collision Avoidance") at the media access control MAC level, which causes data transmission collisions and a great deal of collision time, which slows down the collection of information from the electricity meters. This is because, in this type of media access control, each device that wishes to transmit data first listens out on the medium in order to determine whether this medium is free so that said device can transmit its data. If the device detects that the medium is free, it transmits its data. If at the same moment another device is sending data over the medium, the data collide with each other. In this case, the two devices determine a random period at the end of which they listen on the medium again and remake an attempt at transmission if the medium is free. This random period is called collision time (or period). It is preferable to minimise the time spent by the devices in collision periods, to limit the latency of collection of the data from these devices. It will in fact be easily understood that data communications that take place directly, without passing through collision periods, are more rapid.

Time division multiplex TDM methods exist wherein, in order to avoid the electricity meters transmitting information at the same moment, cycles of pre-established periods of speaking time are introduced. However, these methods have the drawback of requiring synchronising all the electricity meters with each other and are known to be ineffective in terms of occupation of the communication medium.

It is desirable to overcome these drawbacks of the prior art. It is in particular desirable to propose a method that makes it possible to read a maximum number of electricity meters in a minimum amount of time. It is particularly desirable for this method to minimise the collision time on the powerline communication network. It is also desirable to provide a solution that is simple to implement at low cost.

DISCLOSURE OF THE INVENTION

For this purpose, a method for collecting information by a data concentrator from electricity meters in a powerline communication network is proposed, the method being implemented by the data concentrator and comprises: obtaining a distribution of the electricity meters into a plurality of classes, a first class comprising electricity meters for which no information has been collected during a previous implementation of the method, and at least second and third classes wherein the rest of the electricity meters are distributed according to a level of response to information requests transmitted by the data concentrator, the classes following a sequencing as from the second class by decreasing values of said response levels; obtaining a sequencing of the electricity meters, in each class, according to an overall risk of collision incurred in the powerline communication network by each electricity meter; forming a list L of a maximum number M of electricity meters addressed in parallel by the data concentrator for collecting information; sending an information request, for said collection, to each electricity meter in the list L; for each electricity meter in the list L, on reception of a response to an information request coming from said electricity meter for said collection or on the expiry of a predefined maximum waiting time since the sending of said information request to said electricity meter, removing the electricity meter from the list L and seeking another electricity meter to be addressed in parallel from the remaining electricity meters in the list L. The method is such that the data concentrator seeks to maximise the number of electricity meters in the list L by prioritising the electricity meters according to the sequencing of the classes, and then according to the sequencing of the electricity meters according to the overall risk of collision, and the data concentrator adds a new electricity meter to the list L only if a score representing a risk of collision between said new electricity meter and specifically each of the electricity meters present in the list L is below a predefined threshold STH. Collecting information thus makes it possible to read a maximum number of electricity meters in a minimum amount of time. The collision time on the powerline communication network is minimised, while maximising the number of electricity meters that are addressed in parallel.

According to a particular embodiment, the score representing a risk of collision between two electricity meters depends on the number of common nodes in paths used by the electricity meters in question for communicating with the data concentrator in the powerline communication network and a difference in position of each common node in said paths.

According to a particular embodiment, the score representing a risk of collision between two electricity meters m and k, is defined as follows:

$$S_m^k = \sum_{j=1}^{Q} C \times w^E$$

where $S_m^k$ is the score representing a risk of collision between the two electricity meters m and k, Q is said number of common nodes, j is a pointer to said common nodes, E is said difference in position for the common node pointed to by the pointer j, C is a default collision cost for each common node where the difference E is zero, and w is an attenuation coefficient lying in the interval [0;1[.

According to a particular embodiment, the overall risk of collision of the electricity meter m is defined by $$R_m = \sum_k S_m^k$$

According to a particular embodiment, the overall risk of collision R of each electricity meter is proportional to a number of neighbours in a network neighbourhood of said electricity meter.

According to a particular embodiment, the overall risk of collision R of each electricity meter is proportional to a density, in terms of electricity meters present, of a zone of the powerline communication network to which the electricity meter in question is allocated.

According to a particular embodiment, the data concentrator identifies each orphan electricity meter, which is an electricity meter for which a path to be used for communicating with the data concentrator is not known to the data concentrator at the moment of triggering the information collection, excludes said orphan electricity meter from the classes, and independently addresses each orphan electricity meter for collecting information.

A computer program that can be executed by a processor is also proposed. This computer program comprises instructions for implementing the method mentioned above in any one of the embodiments thereof, when these instructions are executed by the processor. The invention also relates to an information storage medium that stores such a computer program and is intended to be read by the processor in order to implement the aforementioned method in any one of the embodiments thereof.

A data concentrator configured for making an information collection from electricity meters in a powerline communication network is also proposed, the data concentrator comprising electronic circuitry configured for: obtaining a distribution of the electricity meters in a plurality of classes, a first class comprising electricity meters for which no information has been collected during a previous implementation of the method, and at least second and third classes in which the rest of the electricity meters are distributed according to a level of response to information requests transmitted by the data concentrator, the classes following a sequencing as from the second class by decreasing values of said response levels; obtaining a sequencing of the electricity meters, in each class, according to an overall risk of collision incurred in the powerline communication network by each electricity meter; forming a list L of at a maximum M electricity meters addressed in parallel by the data concentrator for collecting information; sending an information request, for said collection, to each electricity meter in the list L; for each electricity meter in the list L, on reception of a response to an information request coming from said electricity meter for said collection or on expiry of a predefined maximum waiting time since the sending of said information request to said electricity meter, removing the electricity meter from the list L and seeking another electricity meter to be addressed in parallel from the electricity meters remaining in the list L. The electronic circuitry is configured so that the data concentrator seeks to maximise the number of electricity meters in the list L by prioritising the electricity meters according to the sequencing of the classes, and then according to the sequencing of the electricity meters according to the overall risk of collision, and so that the data concentrator adds to the list L a new electricity meter only if a score representing a risk of collision between said new electricity meter and specifically each of the electricity meters present in the list L is below a predefined threshold STH.

An electrical supply network comprising electricity meters and a data concentrator responsible for making a collection of information from the electricity meters are also proposed, the data concentrator being configured as above.

According to a particular embodiment, the information to which the collection relates is load curve readings.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Hereinafter, embodiments of the invention are described in a context where the powerline communication protocol used is the G3-PLC protocol. The invention can however be implemented by applying other protocols relying on a media access control of the CSMA/CA type, such as for example the PRIME protocol.

Figure 1:
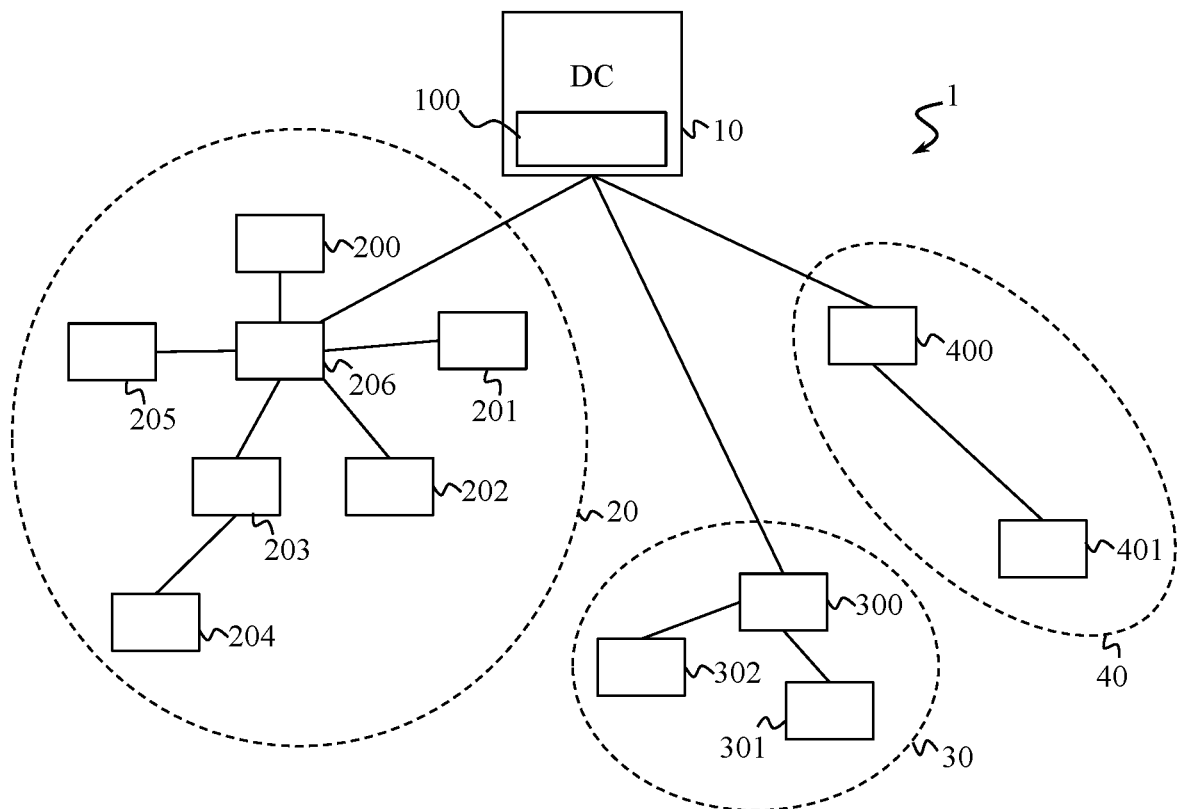
FIG. 1 illustrates schematically an example of an electrical supply network wherein an automatic meter management of the AMM type according to the invention can be implemented.

FIG. 1 illustrates schematically an example of an electrical supply network wherein an automatic meter management of the AMM type according to the invention can be implemented. The electrical supply network comprises K smart electricity meters, simply referred to as "electricity meters" hereinafter. The electricity meters are interconnected by a powerline communication network, simply referred to as "PLC network" hereinafter.

FIG. 1 shows a PLC network 1 comprising a data concentrator DC 10 to which a set of electricity meters are directly or indirectly connected. The electricity meters are grouped together in three groups. A first group 20, which comprises electricity meters 200 to 206, corresponds to a dense zone of the PLC network 1. A dense zone comprises electricity meters having many neighbours in the network neighbourhood thereof, i.e. having a number of neighbours above or equal to a first threshold. The network neighbourhood of an electricity meter is all the devices of the PLC network 1 from which the electricity meter in question directly receives communication signals (typically frames). A second group 30, which comprises electricity meters 300 to 302, corresponds to a moderately dense zone of the PLC network 1. A moderately dense zone comprises electricity meters having a moderate number of neighbours in the network vicinity thereof, i.e. having a number of neighbours below the first threshold and above or equal to a second threshold. A third group 40, which comprises electricity meters 400 and 401, corresponds to a low-density zone of the PLC network 1. A low-density zone comprises electricity meters having a moderate number of neighbours in the network neighbourhood thereof, i.e. having a number of neighbours below the second threshold.

The data concentrator 10 comprises a processing module 100 implementing the method according to the invention. The processing module 100 may be a hardware module natively integrated in the data concentrator 10 or may be connected to the data concentrator 10, for example on a USB (standing for "Universal Serial Bus") port of said data concentrator 10. The processing module 100 may in a variant be a software module implemented by means of a processor and by means of a memory of the data concentrator 10. This aspect is detailed hereinafter in relation to FIG. 2.

Figure 2:
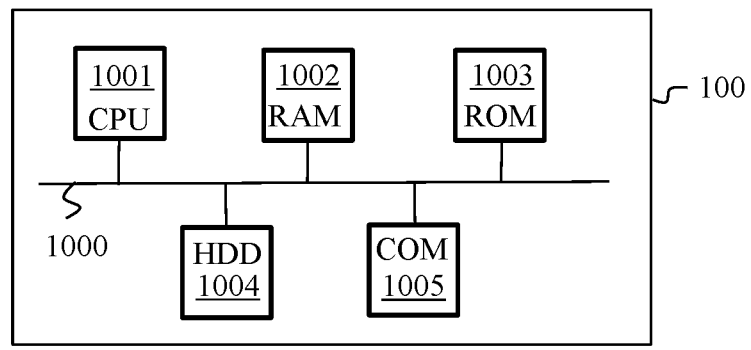
FIG. 2 illustrates schematically an example of hardware architecture of a device that can be used for implementing the invention.

FIG. 2 illustrates schematically an example of hardware architecture of the processing module 100. The processing module 100 then comprises, connected by a communication bus 1000: a processor or CPU (standing for "central processing unit") 1001; a random access memory RAM 1002; a read only memory ROM 1003; a data storage device, such as a hard disk HDD (standing for "hard disk drive"), or a storage medium reader, such as an SD (standing for "Secure Digital") card reader 1004; a set of communication interfaces 1005 enabling the processing module 100 to communicate with other modules of the data concentrator 10 and to communicate directly, or via these other modules of the data concentrator 10, in the PLC network 1.

The processor 1001 is capable of executing instructions loaded in the RAM 1002 from the ROM 1003, from an external memory (not shown), from a storage medium, such as an SD card, or from a communication network. When the data concentrator 10 is powered up, the processor 1001 is capable of reading instructions from the RAM 1002 and executing them. These instructions form a computer program causing the implementation, by the processor 1001, of the steps and algorithms described here in relation to the data concentrator 10 and more particularly in relation to the processing module 100.

All or some of the steps and algorithms described here can thus be implemented in software form by executing a set of instructions by a programmable machine, such as a DSP (digital signal processor) or a microcontroller, or be implemented in hardware form by a machine or a dedicated component (chip), such as an FPGA (standing for "field-programmable gate array") or an ASIC (standing for "application-specific integrated circuit"). In general terms, the processing module 100, and more generally the data concentrator 10, comprises electronic circuitry arranged and configured for implementing the steps and algorithms described here.

Figure 3:
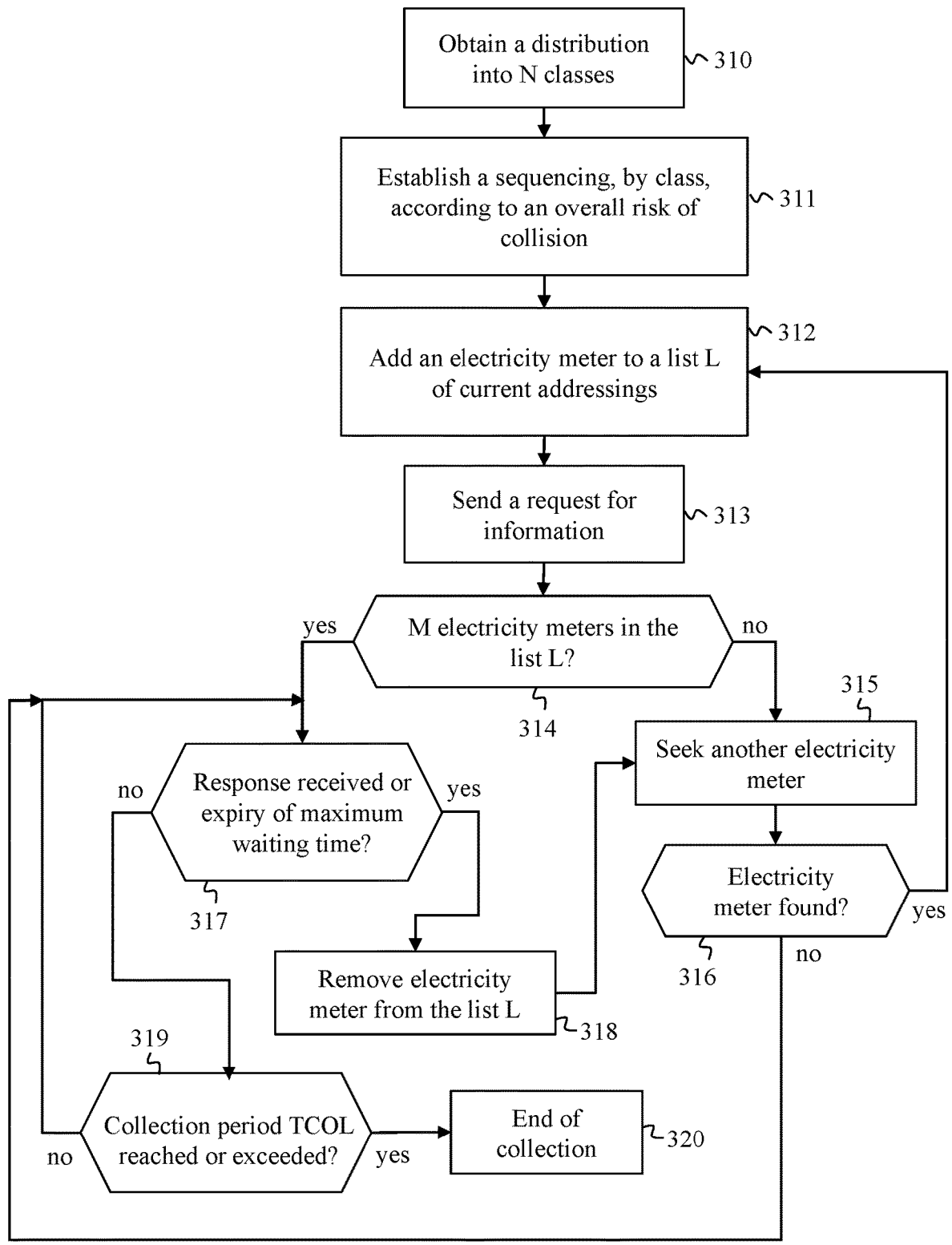
FIG. 3 illustrates schematically a method for collecting information from electricity meters, in a particular embodiment of the invention.

FIG. 3 illustrates schematically a method for collecting information from electricity meters, in a particular embodiment of the invention. The method described in relation to FIG. 3 is implemented by the data concentrator 10, and more precisely by the processing module 100. The method of FIG. 3 is implemented periodically, or on request, for example a request coming from an external server (e.g. from a server of an operator of the electrical supply network).

This method is implemented for a predefined period, referred to as the collection period TCOL, fixing a time allocated to the data concentrator 10 for making, from the electricity meters of the PLC network 1, the collection of the required information (e.g. load curves readings). The data concentrator 10 therefore attempts to collect information from a maximum number of electricity meters of the PLC network 1 during said collection period TCOL. To do this, the data concentrator 10 will use in particular information relating to the topology of the PLC network 1 to reduce the collision time. The data concentrator 10 can have a centralised knowledge of the topology of the PLC network 1. The data concentrator 10 can also interrogate electricity meters in order to obtain therefrom a list of its neighbours and/or routing tables. Commands of the DLMS/COSEM protocol (standing for "Device Language Message Specification/Companion Specification for Energy Metering" according to IEC 62056) protocol can be used to do this. Lower-level commands can also be used. For example, according to the G3-PLC technology, the route discovery function can be used for determining the path between the data concentrator 10 and any electricity meter in the PLC network 1. According to the PRIME technology, the data concentrator implements a base node function and is in this regard a manager of the logic topology of the PLC network 1. The data concentrator therefore knows at any time the list of switches used for transferring information from any electricity meter in the PLC network 1 to the data concentrator.

In a step 310, the processing module 100 obtains a description (e.g. a list of identifiers associated with complementary information) of all the electricity meters to which the collection of information relates. This could be a subset only of the electricity meters in the PLC network 1. In a particular embodiment, all the electricity meters in the PLC network 1 are concerned. In a particular embodiment, the information to be collected is load curve readings of the electricity meters.

These electricity meters are classified in a predetermined total number N of classes. In a particular embodiment, N=3. A first class, called "class A", comprises electricity meters for which no information has been collected during an implementation of said method preceding a current implementation. A second class, called "class B", comprises electricity meters having a response level to information requests transmitted by said data concentrator 10 that is higher than a predetermined reference level REF. A third class, called "class C", comprises electricity meters having a response level to the information requests transmitted by said data concentrator 10 that is lower than or equal to said predetermined reference level REF. In a particular embodiment, the predetermined reference level REF is equal to 50% (which therefore corresponds to an electricity meter that responds one time out of two). A higher reference level may be defined and thus increase the number of classes. The second class (class B) then has a boundary with the third class (class C) fixed by a reference level REF 1, the third class (class C) has a boundary with the fourth class (class D) fixed by a reference level REF 2, etc. Thus the distribution of the electricity meters in the N classes is such that a first class comprises electricity meters for which no information has been collected during a previous implementation of the method, and at least second and third classes comprise the rest of the electricity meters, which are distributed therein according to their response level to the information request transmitted by the data concentrator 10, the classes being ordered as from the second class by decreasing value of said response levels.

The description of all the electricity meters to which the collection of information relates indicates, for each electricity meter, the class to which this electricity meter belongs during the execution of the algorithm in FIG. 3. The description obtained at the step 310 is up to date in relation to the distribution of the electricity meters between the classes with regard to previous implementations of the method that have been able to take place. Either the processing module 100 determines the distribution between the classes at each start of execution of the algorithm in FIG. 3, or the processing module 100 determines the distribution between the classes in the background and, at the step 310, the processing module 100 recovers in memory the distribution between the classes that is the most up to date. The distribution of the classes may therefore change from one execution of the algorithm in FIG. 3 to another. At the very first execution of the algorithm in FIG. 3, the distribution between the classes is for example arbitrary, or random.

The collection of information will consist in addressing the electricity meters among the three classes in parallel, but granting priority between the electricity meters according to the classes thereof: the data concentrator 10 preferentially addresses the electricity meters in class A but, if the data concentrator 10 determines that it does not have another electricity meter in class A that can be addressed in parallel to the electricity meters currently being interrogated, the data concentrator 10 seeks at least one candidate in the class B. The data concentrator 10 preferentially addresses the electricity meters in class B in preference to those in class C but, if the data concentrator 10 determines that it does not have another electricity meter in class B that can be addressed in parallel to the electricity meters currently being interrogated, the data concentrator 10 seeks at least one candidate in class C. And so on.

By proceeding thus, the processing module 100 privileges the electricity meters that were not addressed during the last implementation of the method in FIG. 3, then the electricity meters having overall a good response level and finally the electricity meters having overall a poor response level. However, the processing module 100 draws as required from one or more classes with a lower priority to optimise the parallelisation of the collections from the electricity meters in the PLC network 1.

In addition, in this way, the risk of the electricity meters that have a poor response level slowing down the collection of the information from the other electricity meters is reduced. This is because an electricity meter having a poor level of response to the previous information requests is an electricity meter that has a high probability of not responding to a new information request sent to it. However, an electricity meter that does not respond causes latencies at the data concentrator 10, since the latter must wait for a predefined maximum timeout MAXTO before being able to consider that the electricity meter is not responding, and to pass to another electricity meter in the PLC network 1. This limitation is related to the following constraint: the data concentrator 10 is capable of addressing or enabled to address only a number M of electricity meters in parallel. The predefined maximum timeout MAXTO is intended to enable the electricity meter addressed to have sufficient time in theory (with regard, e.g., to design specifications) for providing the information required by the data concentrator 10, including the time for routing communications in the PLC network 1. On the other hand, an electricity meter having a good response level has a high probability of responding almost immediately to an information request and the data concentrator 10 thus does not have to wait for the predefined maximum timeout MAXTO to be able to pass to another electricity meter in the PLC network 1. This treatment of the electricity meters by class therefore makes it possible already to accelerate the collection of information compared with a random or arbitrary taking account of the electricity meters.

The description of the algorithm in FIG. 3 below considers by way of illustration the aforementioned three classes A, B and C (N=3), but can easily be derived to support a larger number of classes.

In a step 311, the processing module 100 establishes a sequencing of the electricity meters by class according to an overall risk of collision R for a transmission made from the electricity meter in question to the data concentrator 10, with regard to the topology of the PLC network 1. The sequencing is such that the electricity meters are presented by decreasing values of their overall risk of collision R. This sequencing subsequently makes it possible, under certain conditions (see FIG. 4), to address as a priority electricity meters that have a lower risk of collision when they are addressed by the data concentrator 10.

It should be noted that the risk R is an overall risk of collision, to be distinguished from the collision score S that is used hereinafter in the context of FIG. 4 and which represents a risk of collision between two electricity meters when these two electricity meters are addressed in parallel by the data concentrator 10. However, as explained in the remainder of the description of FIG. 4, the overall risk of collision $R_m$ associated with an electricity meter m can be calculated, in a particular embodiment, as the sum of the collision scores $S_m^k$ between this electricity meter m and all the K−1 other electricity meters k (k≠m) of the PLC network 1.

In another particular embodiment, the overall risk of collision R of an electricity meter is proportional to the number of neighbours in the network neighbourhood of said electricity meter. This is because, the larger the network neighbourhood of an electricity meter in terms of number of neighbours, the higher the risk of collision for the transmissions of said electricity meter.

In yet another particular embodiment, the overall risk of collision R of an electricity meter is proportional to a density, in terms of electricity meters present, of a zone of the PLC network 1 to which the electricity meter in question is allocated. This is because, the denser the zone in terms of electricity meters present, the higher the risk of collision for the transmissions of these electricity meters. The definition of the zones of the PLC network 1 and of the densities thereof may correspond to predefined geographical zones the population density of which is known. The definition of the zones of the PLC network 1 for the allocation of the electricity meters concerned, and of the densities thereof, is for example preinstalled in the memory of the data concentrator 10.

When two electricity meters have the same overall risk of collision R, the processing module 100 chooses the order between these two electricity meters by applying a supplementary criterion, or arbitrarily, or randomly.

In a step 312, the processing module 100 adds an identifier of the electricity meter selected in a list L. The list L indicates which electricity meters are addressed in parallel. At the first occurrence of the step 312, the list L is empty and the processing module 100 places therein an identifier of the electricity meter indicated, for class A, initially in accordance with the sequencing established at the step 311.

In a step 313, the processing module 100 sends an information request to the electricity meter that was added to the list L. The information request is transmitted in unicast mode, for example in the form of a DLMS/COSEM command.

In the step 314, the processing module 100 checks whether M electricity meters are present in the list L. This is because, as already indicated, the data concentrator 10 is capable of addressing or enabled to address only M electricity meters in parallel. If the list L contains M electricity meters, a step 317 is performed; otherwise a step 315 is performed.

In the step 315, the processing module 100 seeks whether another electricity meter may come to supplement the list L. The processing module 100 seeks to maximise the number of electricity meters actually in the list L (and therefore which are addressed in parallel), prioritising the electricity meters according to the sequencing of the classes, and then according to the sequencing of the electricity meters according to the overall risk of collision. The processing module 100 adds a new electricity meter to the list L only if the collision score S between said new electricity meter and specifically each of the electricity meters present in the list L is below a predefined (fixed) threshold STH. A particular embodiment is detailed below in relation to FIG. 4.

In the step 316, the processing module 100 determines whether an electricity meter has been found at the step 315. If such is the case, the step 312 is repeated in order to add, to the list L, the electricity meter found and to send to it an information request in the step 313. If no electricity meter has been found, this means that the list L does not contain M electricity meters but the remaining candidates have an excessively high risk of collision. This situation is resolved by removing an electricity meter from the list L, either by receiving a response from said electricity meter to the information request that was sent to it by the data concentrator 10 at the step 313, or by the expiry of the predefined maximum timeout MAXTO. Then the step 317 is performed.

In the step 317, the processing module 100 determines whether the data concentrator 10 has received a response from an electricity meter identified in the list L or whether the predefined maximum timeout MAXTO has been reached or exceeded since the information request was sent to an electricity meter identified in the list L. If such is the case, a step 318 is performed; otherwise a step 319 is performed.

In the step 318, the processing module 100 removes, from the list L, the electricity meter the response of which has been received (and therefore for which the information sought has been collected) or for which the predefined maximum timeout MAXTO has been reached or exceeded since the information request was sent to it. A place is therefore released in the list L and the processing module 100 can consider addressing another electricity meter in parallel to those already present in the list L. The step 315 is consequently performed.

In the step 319, the processing module 100 checks that the time elapsed since the start of the implementation of the method in FIG. 3 is less than the collection time TCOL. If the collection time TCOL is reached or exceeded, the step 317 is repeated. Otherwise the processing module 100 ends the method in a step 320.

Figure 4:
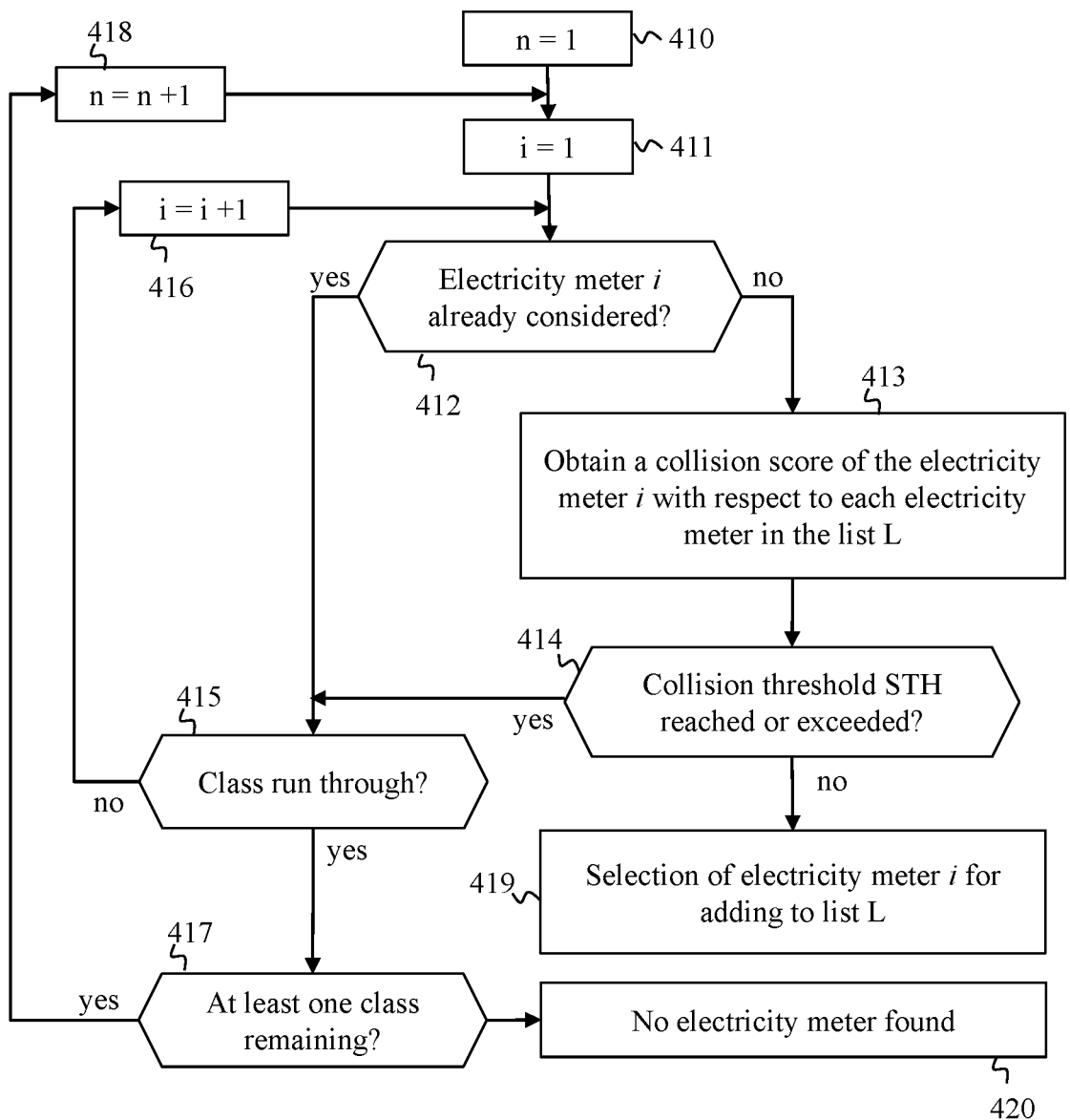
FIG. 4 illustrates schematically a method for seeking a new electricity meter to be addressed, in a particular embodiment of the invention.

FIG. 4 illustrates schematically a method for seeking a new electricity meter to be addressed, in a particular embodiment of the invention. The algorithm in FIG. 4 proposes an embodiment of the step 315.

In a step 410, the processing module 100 initialises a variable n to 1. The variable n is used for running through the classes in increasing order, i.e. from the first class (class A, n=1) to the third (class C, n=3) in the example with three classes already dealt with.

In a step 411, the processing module 100 initialises a variable i to 1. The variable i is used for running through, within a class, the electricity meters according to the sequencing established at the step 311.

In a step 412, the processing module 100 determines whether the electricity meter i has already been considered in the current information collection. If such is the case, the processing module 100 must evaluate whether another electricity meter can join the list L, and a step 415 is performed. If not, a step 413 is performed.

In the step 413, the processing module 100 obtains a collision score of the electricity meter i in relation to each electricity meter in the list L. The collision score therefore represents a risk of collision for a pair of electricity meters (which may be in different classes) in question, i.e. a risk that a transmission of information originating in an electricity meter in the pair comes into collision, at any point whatsoever on the path to the data concentrator 10, with a simultaneous transmission of information originating from the other electricity meter in the pair, or a risk that messages sent at the same moment by these two electricity meters oblige a node fulfilling the role of relay to put one of these messages on standby. The higher the collision score, the higher the risk of collision during simultaneous addressings of the electricity meters in question.

In a particular embodiment, the collision score S depends on a number Q of common nodes on the paths that connect the two electricity meters in the pair with the data concentrator 10 and, where applicable, the difference E between the number of hops necessary for reaching the common node in question from one of the electricity meters in the pair and the number of hops necessary for reaching the common node in question from the other one of the electricity meters in the pair. Preferentially, the collision score $S_m^k$ between the electricity meter m and the electricity meter k is defined as follows:

$$S_m^k = \sum_{j=1}^{Q} C \times w^E$$

where the parameter C is a default collision cost attributed for each node in common located at equal distances (in number of hops) from the two electricity meters m and k. The parameter C is positive and is for example obtained experimentally. The parameter w is a predefined attenuation coefficient that attenuates the impact of the predefined cost C in calculating the collision score S when the common node has a non-zero difference E (in difference of hops) on the two paths, i.e. when said common node is not at the same position on the two paths. Therefore, when the difference E is zero (same position on the two paths), the default collision cost C is applied. The parameter w is a positive value lying in the interval [0;1[. The greater this difference E, the smaller the contribution of the common node in question in calculating the collision score S.

In an example embodiment, C=0.75 and w=0.5. We consider according to FIG. 1 that:

the path that connects the electricity meter 200 to the data concentrator 10 passes through the electricity meter 206, which fulfils the role of relay;

the path that connects the electricity meter 201 to the data concentrator 10 passes through the electricity meter 206, which fulfils the role of relay;

the path that connects the electricity meter 204 to the data concentrator 10 passes through the electricity meter 203, and then through the electricity meter 206, which fulfil the role of relay;

the electricity meter 302 is directly connected to the data concentrator 10 (without relay).

All the paths therefore have at least the data concentrator 10 in common.

The pair consisting of the electricity meters 200 and 201 has two nodes in common located at equal positions on the two paths (therefore E=0). In this case, the collision score S for this pair, denoted $S_{200}^{201}$, is:

$$S_{200}^{201} = 0.75 \times 0.5^0 + 0.75 \times 0.5^0 = 1.5$$

The pair consisting of the electricity meters 200 and 204 has two nodes in common, the positions of which are offset by one hop between the two paths (therefore E=1). In this case, the collision score S for this pair, denoted $S_{200}^{201}$, is:

$$S_{200}^{204} = 0.75 \times 0.5^1 + 0.75 \times 0.5^1 = 0.75$$

The pair consisting of the meters 200 and 302 has one node in common located at equal positions on the two paths (therefore E=0). In this case, the collision score S for this pair, denoted $S_{200}^{302}$, is:

$$S_{200}^{302} = 0.75 \times 0.5^0 = 0.75$$

By comparing the collision score with the predefined threshold STH already mentioned (for example the predefined threshold STH is fixed experimentally), the processing module 100 can evaluate whether the electricity meters in question do or do not have excessive risks of collision if they were to be addressed in parallel by the data concentrator 10.

Thus, in a step 414, the processing module 100 checks whether the collision score of the electricity meter i with respect to at least one electricity meter in the list L is above the predefined threshold STH. For example, in the above numerical example, the predefined threshold STH is fixed at 1.

If the collision score of the electricity meter i with respect to at least one electricity meter in the list L has reached or exceeded the predefined threshold STH, the processing module 100 considers that the electricity meter i has an excessive risk of collision with at least one electricity meter present in the list L. The processing module 100 must then evaluate whether another electricity meter can join the list L, and the step 415 is performed. If the collision score of the electricity meter i with respect to any electricity meter in the list L has reached or exceeded the predefined threshold STH, the processing module 100 considers that the electricity meter i can be addressed in parallel to any electricity meter present in the list L and that the electricity meter i can be added to the list L. A step 419 is then performed, wherein the processing module 100 selects the electricity meter i to be added to the list L, and the algorithm in FIG. 4 is ended.

In the step 415, the processing module 100 checks whether the whole of the class designated by the variable n has been run through. If such is the case, a step 417 is performed; otherwise a step 416 is performed.

In the step 416, the processing module 100 increments the variable i by one unit in order to consider the following electricity meter, in the class n, in accordance with the sequencing established at the step 311. The step 412 is then repeated in order to check whether the electricity meter newly represented by the variable i has already been considered in the current information collection.

In the step 417, the processing module 100 checks whether there remains at least one class to be run through, which is the case if n<N. If such is the case, a step 418 is performed.

In the step 418, the processing module 100 increments the variable n by one unit in order to consider the following class in the fixed order of priority. The step 411 is then repeated to reset the variable i to 1, in order to begin to run through the newly selected class in accordance with the sequencing established at the step 311.

In the step 419, the processing module 100 selects the electricity meter i to be added to the list L. The electricity meter i will therefore thus be addressed in parallel with the electricity meters already present in the list L. The algorithm in FIG. 4 is ended.

In the step 420, the processing module 100 ends the algorithm in FIG. 4 without having found the electricity meter able to be addressed in parallel with the electricity meters present in the list L. As already explained in relation to FIG. 3, the processing module 100 must then wait until at least one electricity meter leaves the list L, to attempt to seek once again to supplement said list L. The algorithm in FIG. 4 is ended.

The overall risk of collision R disclosed in the context of FIG. 3 may, in a particular embodiment, be the sum of the collision scores of all the possible pairs of the PLC network 1 that comprise the electricity meter to which the overall risk of collision R applies. Taking the preferential formula for calculating the collision score S expressed below:

$$R_m = \sum_k S_m^k$$

where $R_m$ represents the overall risk of collision for the electricity meter m, $S_m^k$ represents the collision score for the pair formed by the electricity meter m and the electricity meter k (k≠m). Account is not taken of the data concentrator 10.

Taking the example of the electricity meter 200 in FIG. 1:

$$R_{200} = S_{200}^{201} + S_{200}^{202} + S_{200}^{203} + S_{200}^{204} + S_{200}^{205} + S_{200}^{206} + S_{200}^{300} + S_{200}^{301} + S_{200}^{302} + S_{200}^{400} + S_{200}^{401}$$

Using a mean of these collision scores for calculating the overall risk of collision gives the same relative result from one electricity meter to another.

In a particular embodiment, the processing module 100 treats separately each electricity meter for which the path to be used for communicating with the data concentrator 10 is not completely known to the data concentrator 10 at the moment of triggering the information collection. An "orphan" electricity meter is spoken of. In this case, the processing module 100 identifies each orphan electricity meter and does not exclude it from the classes. Each orphan electricity meter can be addressed before the electricity meters classed (those for which the path to be used for communicating with the data concentrator 10 is known to the data concentrator 10 at the moment of triggering the information collection) or afterwards. The addressings of the orphan electricity meters may be distributed between before and after, according to a predetermined criterion. When there is a plurality of orphan electricity meters, they are addressed by the data concentrator 10 without parallelisation.

The invention claimed is:

1. A method for collecting information by a data concentrator from electricity meters in a powerline communication network, implemented by the data concentrator and comprising:
   obtaining a distribution of the electricity meters into a plurality of classes, a first class comprising electricity meters for which no information has been collected during a previous implementation of the method, and at least second and third classes wherein the rest of the electricity meters are distributed according to a level of response to information requests transmitted by the data concentrator, the classes following a sequencing as from the second class by decreasing values of said response levels;
   forming a list L of a maximum number M of electricity meters addressed in parallel by the data concentrator for collecting information;
   sending an information request, for said collection, to each electricity meter in the list L;
   for each electricity meter in the list L, on reception of a response to an information request coming from said electricity meter for said collection or on the expiry of a predefined maximum waiting time since the sending of said information request to said electricity meter, removing the electricity meter from the list L and seeking another electricity meter to be addressed in parallel from the remaining electricity meters in the list L;
   the method being such that the data concentrator adds to the list L a new electricity meter only if a score representing a risk of collision between said new electricity meter and specifically each of the electricity meters present in the list L is below a predefined threshold STH, wherein the method further comprises:
   establishing a sequencing of the electricity meters, in each class, according to an overall risk of collision incurred in the powerline communication network by each electricity meter; and such that the data concentrator seeks to maximise the number of electricity meters in the list L among the classes in parallel by prioritising the electricity meters according to the sequencing of the classes, and then according to the sequencing of the electricity meters according to the overall risk of collision.

2. The method according to claim 1, wherein the score representing a risk of collision between two electricity meters depends on the number of common nodes in paths used by the electricity meters in question for communicating with the data concentrator in the powerline communication network and a difference in position of each common node in said paths.

3. The method according to claim 2, wherein the score representing a risk of collision between two electricity meters m and k, is defined as follows:

$$S_m^k = \sum_{j=1}^{Q} C \times w^E$$

where $S_m^k$ is the score representing a risk of collision between the two electricity meters m and k, Q is said number of common nodes, j is a pointer to said common nodes, E is said difference in position for the common node pointed to by the pointer j, C is a default collision cost for each common node where the difference E is zero, and w is an attenuation coefficient lying in the interval [0;1].

4. The method according to claim 3, wherein the overall risk of collision of the electricity meter m is defined by:

$$R_m = \sum_k S_m^k$$

5. The method according to claim 1, wherein the overall risk of collision R of each electricity meter is proportional to a number of neighbours in a network neighbourhood of said electricity meter.

6. The method according to claim 1, wherein the overall risk of collision R of each electricity meter is proportional to a density, in terms of electricity meters present, of a zone of the powerline communication network to which the electricity meter in question is allocated.

7. The method according to claim 1, wherein the data concentrator identifies orphan electricity meters, which are electricity meters for which a path to be used for communicating with the data concentrator is not known to the data concentrator at the moment of triggering the information collection, excludes said orphan electricity meters from the classes, and independently addresses each orphan electricity meter for collecting information.

8. A non-transitory computer program product comprising instructions for implementing the method according to claim 1, when said instructions are executed by a processor.

9. A non-transitory information storage medium storing a computer program comprising instructions configured for implementing the method according to claim 1, when said instructions are read from the information storage medium and executed by a processor.

10. A data concentrator configured for making a collection from electricity meters in a powerline communication network, the data concentrator comprising electronic circuitry configured for:
   obtaining a distribution of the electricity meters in a plurality of classes, a first class comprising electricity meters for which no information has been collected during a previous implementation of the method, and at least second and third classes in which the rest of the electricity meters are distributed according to a level of response to information requests transmitted by the data concentrator, the classes following a sequencing as from the second class by decreasing values of said response levels;
   forming a list L of at a maximum M electricity meters addressed in parallel by the data concentrator for collecting information;
   sending an information request, for said collection, to each electricity meter in the list L;
   for each electricity meter in the list L, on reception of a response to an information request coming from said electricity meter for said collection or on expiry of a predefined maximum waiting time since the sending of said information request to said electricity meter, removing the electricity meter from the list L and seeking another electricity meter to be addressed in parallel from the electricity meters remaining in the list L;
   the electronic circuitry being configured so that the data concentrator adds to the list L a new electricity meter only if a score representing a risk of collision between said new electricity meter and specifically each of the electricity meters present in the list L is below a predefined threshold STH, wherein the electronic circuitry is furthermore configured for:

establishing a sequencing of the electricity meters, in each class, according to an overall risk of collision incurred in the powerline communication network by each electricity meter; and so that the data concentrator seeks to maximise the number of electricity meters in the list L among the classes in parallel by prioritising the electricity meters according to the sequencing of the classes, and then according to the sequencing of the electricity meters according to the overall risk of collision.

11. An electrical supply network comprising electricity meters and a data concentrator responsible for making a collection of information from the electricity meters, the data concentrator being configured according to 10.

12. The electrical supply network according to claim 11, wherein the information to which the collection relates is load curve readings.

\* \* \* \* \*